United States Patent [19]

Namekawa et al.

[11] Patent Number: 5,519,763

[45] Date of Patent: May 21, 1996

[54] COMMUNICATION APPARATUS WITH WIRELESS INTERCOMMUNICATION

[75] Inventors: Takeshi Namekawa, Tokyo; Masayuki Moteki, Yokohama; Hidenori Hayashi, Tokyo; Yukari Hashibe, Tokyo; Satoshi Fukuda, Tokyo; Ikuo Kitajima, Tokyo, all of Japan

[73] Assignee: Matsushita Graphic Communication System, Inc., Japan

[21] Appl. No.: 364,278

[22] Filed: Dec. 27, 1994

[30]   Foreign Application Priority Data

Dec. 28, 1993   [JP]   Japan ................................. 5-335752

[51] Int. Cl.⁶ ............................. H04M 11/00; H04Q 7/20
[52] U.S. Cl. ................................ 379/61; 379/58; 379/100
[58] Field of Search ............................. 379/58, 59, 61, 379/63, 100, 386; 358/400, 407; 455/33.1

[56]   References Cited

U.S. PATENT DOCUMENTS

| | | | |
|---|---|---|---|
| 4,939,772 | 7/1990 | Goto | 379/100 X |
| 4,991,201 | 2/1991 | Tseng | 379/100 |
| 5,200,991 | 4/1993 | Motoyanagi | 379/61 |
| 5,267,302 | 11/1993 | Kotani et al. | 379/100 |
| 5,282,238 | 1/1994 | Berland | 379/58 |
| 5,353,329 | 10/1994 | Hayashi | 379/58 |
| 5,442,696 | 8/1995 | Lindberg et al. | 379/386 |

FOREIGN PATENT DOCUMENTS

| | | |
|---|---|---|
| 4-29458 | 1/1992 | Japan . |
| 4-57469 | 2/1992 | Japan . |
| 5-160948 | 6/1993 | Japan . |
| 5-300283 | 11/1993 | Japan . |

Primary Examiner—Curtis Kuntz
Assistant Examiner—Michael B. Chernoff
Attorney, Agent, or Firm—Parkhurst, Wendel & Rossi

[57]   ABSTRACT

A communication (comm) apparatus coupled to a telephone (tel) line comprises a base having a tel portion, a fax portion including a fax modem, a first switch for switching the mode between fax and tel, and a first wireless comm portion, and at least a cordless unit having a second wireless comm portion for communicating with the base, and a second fax portion including a recording/reading portion. The cordless unit may further comprise a second tel portion and a second switch for switching the mode between fax and tel wherein the base can change the second switch to the other mode if necessary. A cordless phone may be further provided. In response to a fax call, the base holds the line but the cordless unit does the fax procedure and if there is no response from the cordless unit within a given interval, the line is disconnected wherein each of cordless unit responds with a different delay time to have a priority. During facsimile comm, an erroneous on-hook is neglected. A cordless unit has a guidance portion for outputting a given message and if there is an extension call to other cordless unit in fax mode, the other cordless unit transmits a control signal and the cordless unit outputs the message. The wireless comm portion has multi-channels to provide a comm between cordless units even when a cordless unit receives a fax signal.

13 Claims, 8 Drawing Sheets

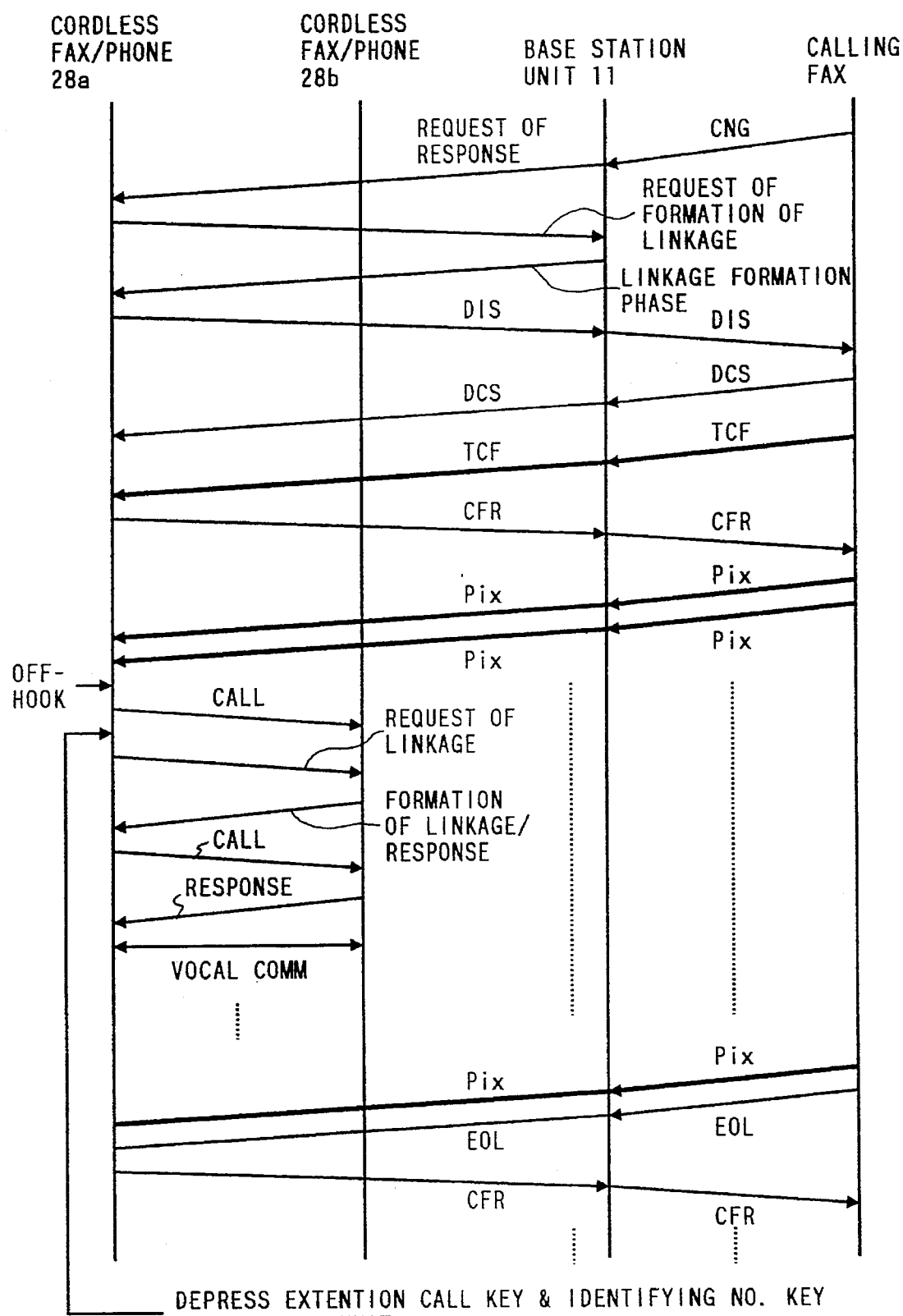

COMMUNICATION APPARATUS WITH WIRELESS INTERCOMMUNICATION

BACKGROUND OF THE INVENTION

1. Field of the Invention

This invention relates to a communication apparatus with wireless intercommunication for communicating with a communication line by a wireless base station unit and cordless units.

2. Description of the Prior Art

A telephone apparatus comprising a base station unit coupled to a telephone line having a telephone portion, a facsimile portion, and a transmission and receiving portion and a cordless phone communicating with the transmission and receiving portion through a radio wave is known. Japanese patent application provisional publication No. 4-29458 discloses such a prior art telephone apparatus. In addition, the cordless phone can control the facsimile portion in either an automatic switching mode. This switching is effected in accordance with a received telephone signal or a facsimile signal or a manual switching mode.

In such a prior art telephone apparatus, there is a problem that a user should walk to the place of the base station to bring or transmit a facsimile copy though the user uses the cordless phone.

SUMMARY OF THE INVENTION

The aim of the present invention is to provide an improved communication apparatus with wireless intercommunication.

According to the present invention there is provided a communication apparatus comprises: a base station coupled to a communication line having: a network control portion for controlling a communication with the communication line and receiving a first sound signal from the communication line and transmitting a second sound signal to the communication line; a first control portion for detecting a telephone call and a facsimile call from the communication line, generating a first cordless control signal and a switch control signal, and receiving a second cordless control signal; a modem for demodulating a first facsimile signal from the communication line and modulating and transmitting a second facsimile signal to the communication line; a first wireless communication portion for transmitting the first sound signal from the network control portion, the first facsimile signal from the modem, and the first cordless unit control signal from the control portion, and receiving and supplying the second sound signal to the network control portion, the second facsimile signal to the modem, and a second control signal to the control portion; and a switch circuit responsive to the switch control signal for providing a first signal passage for the first and second sound signals between the network control portion and the wireless communication portion in a telephone mode and providing a second signal passage for the first and second facsimile signal between the wireless communication portion and the modem in a facsimile mode; and at least a cordless unit having: a second wireless communication portion for receiving the first sound signal, first facsimile signal, and the first cordless unit control signal from the first wireless communication portion and transmitting the second sound signal signal, the second facsimile signal, and the second cordless unit control signal toward the first wireless communication; a facsimile recording and reading portion for recording the first facsimile signal from the second wireless communication portion and reading a copy and supplying the second facsimile signal to the base station through the first and second wireless communication portions; and a second control portion for receiving the first cordless unit control signal from the second wireless communication portion and generating the second cordless unit control signal, the first and second control portion effecting a controlling through the first and second cordless unit control signals such that in response to the detected call, wherein the first control portion communicates with the second control portion to receive the first facsimile signal through the first and second wireless communication portions and in response to a command, and the second control portion communicates with the first control portion to transmit the second facsimile signal to the communication line through the first and second wireless communication portions.

In the communication apparatus mentioned above, the cordless unit may further comprise: a telephone portion, having a handset, for receiving and reproducing the first sound signal from the second wireless communication portion and supplying the second sound signal to the second wireless communication portion; and a second switch circuit for providing a third signal passage for the sound signal between the second wireless communication portion and the telephone portion in a telephone mode and providing a fourth signal passage for the facsimile signal between the second wireless communication portion and the recording and reading portion in the facsimile mode.

In the communication apparatus, may further comprise: a cordless phone having: a third wireless communication portion for receiving the first sound signal from the first wireless communication portion and transmitting the second sound signal to the first wireless communication portion; and a telephone portion, having a handset, for receiving and reproducing the first sound signal from the third wireless communication portion and supplying the second sound signal to the third wireless communication portion; a third control portion, the first and third control portion effecting controlling such that in response to the detected telephone call, wherein the first control portion communicates with the third control portion through the first and second cordless unit control signals to receive the first facsimile signal through the first and third wireless communication portions and in response to a command, and the third control communicates with the first control portion to transmit the second facsimile signal to the communication line through the first and third wireless communication portions through the first and second cordless unit.

According to the present invention, a communication apparatus coupled to a telephone line comprises a base station unit having a telephone portion, a facsimile portion including a facsimile modem, a first switch for switching the mode between facsimile and telephone modes, and a first wireless communication portion, and at least a cordless unit having a second wireless communication portion for communicating with the base station unit, and a second facsimile portion including a recording/reading portion. The cordless unit may further comprise a second telephone portion and a second switch for switching the mode between facsimile and telephone modes wherein the base station unit can change the second switch to the other mode if necessary. A cordless phone may be further provided. In response to a facsimile call, the base station unit holds the line and does the facsimile procedure but the cordless unit does the facsimile procedure and if there is no response from the cordless unit within a given interval, the line is disconnected wherein each of cordless unit responds with a different delay time to have a priority. During facsimile communication, an erroneous on-hock is neglected using a timer. A cordless unit has a guidance portion for outputting a predetermined message and if there is an extension call to other cordless unit which is in facsimile mode, the other cordless unit transmits a control signal and the cordless unit outputs the message. The wireless communication portion has multi-channels to provide a communication between cordless units even when a cordless unit receives a facsimile signal.

BRIEF DESCRIPTION OF THE DRAWINGS

The objects and features of the present invention will become more readily apparent from the following detailed description taken in conjunction with the accompanying drawings in which:

FIG. 8 is a time chart of the fifth embodiment showing the multi-channel communication operation.

The same or corresponding elements or parts are designated with like references throughout the drawings.

DETAILED DESCRIPTION OF THE INVENTION

Figure 1:
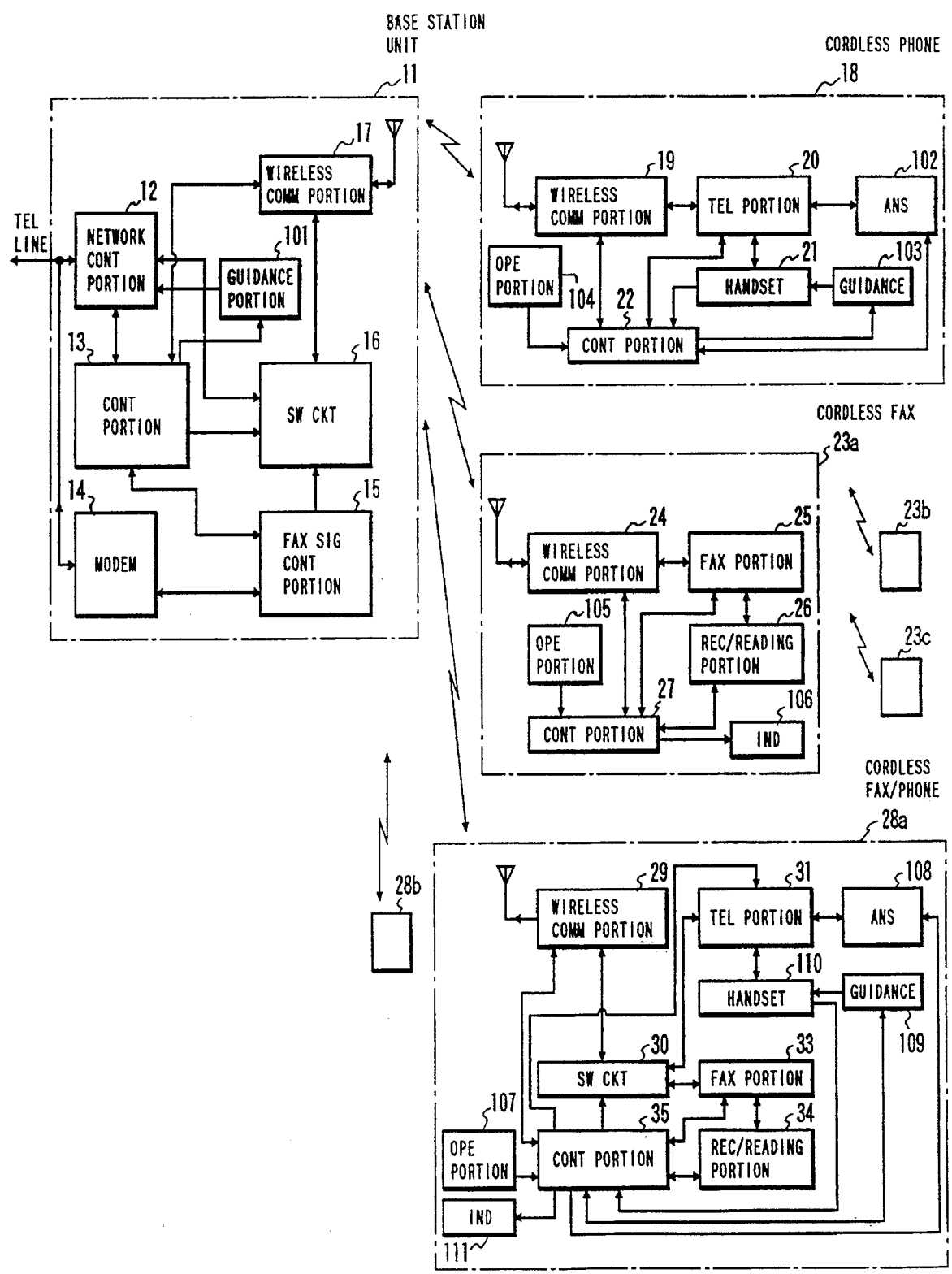
FIG. 1 is a block diagram of first and second embodiments showing a communication apparatus with wireless intercommunication, having a facsimile portion.

Hereinbelow will be described a first embodiment of this invention. FIG. 1 is a block diagram of the first embodiment and a second embodiment showing a communication apparatus with wireless intercommunication, having a facsimile (FAX) portion.

The communication apparatus of this embodiment comprises a base station unit 11, as a private branch exchange, coupled to a telephone line as a communication line, and a plurality of cordless terminals including a cordless phone 18, cordless facsimiles 23a to 23c, and a cordless facsimile/phones 28a and 28b. The base station unit 11 provides a communication between the telephone line with either of the cordless phone 18, the cordless facsimiles 23a to 23c, or the cordless facsimile/phones 28a and 28b. The base station unit 11 comprises a network control portion 12 (interface circuit) coupled to the telephone line for controlling the communication between a partner telephone or facsimile and this base station unit 11 and for providing a signal passage of a sound signal between the telephone line and a switching circuit 16, a modem 14 for receiving and transmitting a facsimile signal through demodulation and modulation of a pictorial signal, a facsimile signal control portion 15, having a memory, for controlling of a facsimile signal from or to the modem 14, the switching circuit 16 for switching a signal path therethrough between the sound signal from/to the network control portion 12 and the facsimile signal from/to the modem 14, a wireless communication portion 17 for transmitting and receiving the sound signal, the facsimile signal and a control signal through a radio wave signal digital modulated, and a control portion 13 for controlling the network control portion 12, the facsimile signal control portion 15, the switch circuit 16, and a guidance portion 101 for providing a sound message.

The cordless phone 18 comprises a wireless communication portion 19 For transmitting and receiving the sound signal from/to the wireless communication portion 17 of the base station unit 11 and a cordless unit control signal between the control portion 13 of the base station unit 11 and a control portion 22 of this cordless phone 18 through a radio wave signal digital modulated, a telephone portion 20 coupled to the wireless communication portion 19 and a handset 21, the handset 21 for receiving the sound signal from the wireless communication portion 19 and generating the sound signal to supply a reproduced sound to a user and receiving a sound and converting it to a sound signal to supply the sound signal to the telephone portion 20, an automatic answering portion 102 for effecting an automatic answering operation in response to a call to the telephone portion 20 and an automatic answering mode signal, an operation portion 104 for generating and supplying operational command signal, including the automatic answering mode signal, to a control portion 22, a guidance portion 103, having a memory, for reproducing and supplying a predetermined sound message to the handset 21, the control portion 22 for controlling the wireless communication portion 19, the telephone portion 20, the automatic answering portion 102, a guidance portion 103 and responding to the operation portion and a hock switch included in the handset 21. The cordless unit control signal is used between the control portion 13 of the base station unit 11 and a control portion of either of cordless units 18, 23a to 23c, or 28a and 28b.

The cordless facsimile 23 comprises a wireless communication portion 24 for transmitting and receiving the facsimile signal and the cordless unit control signal from or to the wireless communication portion 17 of the base station unit 11 through the radio wave signal, a facsimile portion 25 coupled to the wireless communication portion 19 and a recording/reading portion 26 for recording the pictorial signal from the wireless communication portion 24 and reading a copy to generate and supplying the facsimile signal to the wireless communication portion 24, an operation portion 105 for generating and supplying operational command signal to a control portion 27, an indication portion, having a memory, for reproducing and supplying a predetermined visual message to an operator, the control portion 27 for controlling the wireless communication portion 24, the facsimile portion 25, the recording/reading portion 26, the indication portion 106, and responding to the operation portion 105.

Each of the cordless facsimile/phones 28a and 28b comprises a wireless communication portion 29 for transmitting and receiving the sound signal or a facsimile signal from/to the wireless communication portion 17 of the base station unit 11 and the cordless unit control signal through the radio wave signal, a switching circuit 30 for switching a signal passage condition between a telephone communication mode and a facsimile communication mode, a telephone portion 31 coupled to the wireless communication portion 19 and a handset 110 in the telephone communication mode through the switching circuit 30, the handset 110 for receiving the sound signal from the wireless communication portion 29 and generating the sound signal to supply a reproduced sound to a user and receiving a sound and converting it to a sound signal to supply the sound signal to the telephone portion 31, an automatic answering portion 108 for effecting an automatic answering operation in response to a call to the telephone portion 31 and an automatic answering mode signal or the like, an operation portion 107 for generating and supplying operational command signal, including the automatic answering mode signal, to a control portion 35, a guidance portion 109, having a memory, for reproducing and supplying a predetermined sound message to the handset 110, a facsimile portion 33 for receiving and sending the pictorial signal from/to wireless communication portion 29 in the facsimile communication mode through the switching circuit 30, a recording/reading portion 34, having a buffer memory, for recording the pictorial signal from the facsimile portion 33 and reading a copy to generate and supplying the pictorial signal to the wireless communication portion 29, an operation portion 107 for generating and supplying operational command signal to a control portion 35, an indication portion 111, having a memory, for reproducing and supplying a predetermined visual message to an operator, the control portion 35 for controlling the wireless communication portion 29, the switching circuit 30, the telephone portion 31, the automatic answering portion 108, a guidance portion 109, the facsimile portion 25, the recording/reading portion 26, the indication portion 111, and responding to the operation portion 107 and a hook switch included in the handset 110.

A general operation will be described.

When a call reaches the base station unit 11 from the telephone line, the network control portion 12 detects the call and then, detects a CNG signal indicative of requesting a facsimile communication operation through the network control portion 12. If the network control portion 12 detects the CNG signal, the control portion 13 effects the controlling as follows:

The modem portion 14 demodulates the facsimile signal and the facsimile signal control portion 15 temporary stores and reads the demodulated facsimile signal including a pictorial signal. The wireless communication portion 17 effects the digital modulation to the facsimile signal to produce a digital modulated facsimile signal suited for wireless intercommunication between the base station unit 22 and the cordless units of the cordless phone 18, cordless facsimiles 23a to 23c, or the cordless facsimile/phone 28a and 28b. The wireless communication portion 17 transmits the digital modulated facsimile signal to the cordless facsimiles 23a to 23c and the cordless facsimile/phones 28a and 28b. Either of the cordless facsimile 23a to 23c or the cordless facsimile/phones 28a and 28b receives and demodulates the digital modulated facsimile signal and records it by the recording/reading portion 26 or 34 using the buffer memory.

If the CNG signal is not detected, the control portion 13 controls the switching circuit 16 to supplying the received sound signal from the network control portion 12 to the wireless communication portion 17 to digital-modulate the sound signal and to transmit the digital-modulated sound signal to the cordless phone 18 or the cordless facsimile/ phone 28a or 28b. The wireless communication portion 19 or 29 of the cordless phone 18 or the cordless facsimile/ phone 28a or 28b receives and demodulates. The telephone portion 20 or 31 outputs the demodulated sound signal by the handset 21 or 110.

When a call is made by the cordless phone 18, an operator off-hooks the handset 21 and dials. The off-hook and the dial signal are transmitted to the base station unit 11 through the telephone portion 20 and the wireless portion 19. The control portion 13 detects the off-hook from the cordless phone through the wireless communication portion 17 and then, controls the network control portion 12 and the switch circuit 16 to send the off-hook and the dial signal to the telephone line through the network control portion 12. When a called party responds this call, the line has been connected, so that a communication between the called party and the caller is provided.

When a facsimile transmission is effected from the cordless facsimile 23a, an operator sets a copy on a recording/ reading portion 26 and operates the operation portion 105. Then, the control portion 27 controls the recording/reading portion 26, the facsimile portion 25, and the wireless communication portion 24 as follows:

The control portion 27 generates and transmits an off-hook signal and a dial signal to the base station. The control portion 13 of the base station unit 11 calls a communication partner using the network control portion 12. When the line is connected, the control portion 18 transmits a cordless unit control signal to the cordless facsimile 23 to transmit the copy. Then, the recording/reading portion 26 reads the copy, in response to this, the facsimile portion 25 generates the facsimile signal including the pictorial signal and the wireless communication portion 27 transmits it to the wireless communication portion 17. The switch circuit 16, the facsimile signal control portion 15, and the modem 14 transmit the facsimile signal including the pictorial signal to the communication partner through the telephone line.

The mode change by the switch circuit 16 is automatically made in response to the presence of the CNG signal by the control portion 13. However, if the base unit station 11 is set in a non-sound communication priority service mode, namely a facsimile communication priority service mode, which is switched to the sound communication mode in the absence of the CNG signal for a predetermined interval, the control circuit 13 operates the guidance portion 101 to provide a sound message to the line until the mode is switched to the sound communication mode. Moreover, this mode change is effected by the cordless phone 18, the cordless facsimile 23, or the cordless facsimile/phone 28 using the cordless unit control signal.

More specifically, if the facsimile communication is made between the base station 11 and the cordless facsimile 23a, the control portion 13 communicates with the second control portion 27 through the cordless unit control signal to receive the facsimile signal from the telephone line through the wireless communication portions 17 and 24 and in response to a command from the operation portion 105, the control portion 27 communicates with the control portion 13 to transmit the second facsimile signal to the telephone line through the wireless communication portions 17 and 24.

Figure 2:
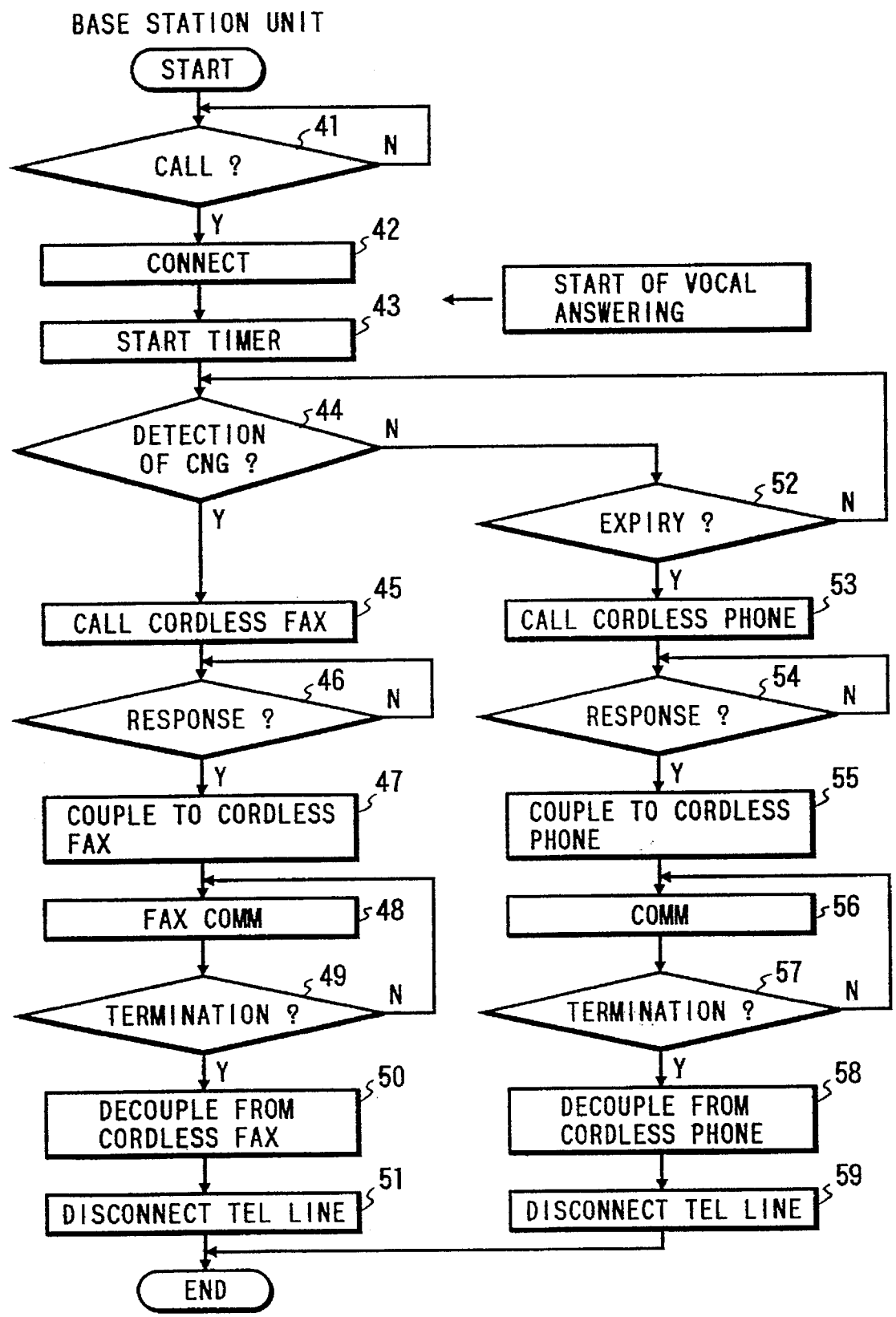
FIG. 2 shows a flow chart representing an operation of the first embodiment.

The above-mentioned operation will be described more specifically with reference to FIG. 2. FIG. 2 shows a flow chart representing the operation of the first embodiment. In the first embodiment, it is assumed that the cordless phone 18 and the cordless facsimile 23a are used. The control portion 18 comprises a microprocessor including a ROM for storing programs for operation, a RAM for storing operational data, and a timer circuit for measuring time and informing of a time expiring timing.

When there is a call, in step 41, the control portion 13 detects this and operates the network control portion 12 to connect the line in step 42. Therefore, after this step, an answering processing is provided. That is, a predetermined sound message is sent to the called party to hold the line by the guidance portion 101. In the following step 43, the control portion 13 starts the timer. If the control portion 13 detects the CNG signal in step 44, the control portion 13 calls the cordless facsimile 23a in step 45. When the cordless facsimile 23a responds this in step 46, the control portion 13 forms the signal passage between the telephone line and the cordless facsimile 23a through the modem 14, the facsimile signal control portion 15, the switch circuit 16, the wireless communication portions 17 and 24, the facsimile portion 25, and the recording/reading portion 26 in step 47. Then, the facsimile communication is made in step 48. When the facsimile communication has been terminated in step 49, the control portion 14 sends the cordless unit control signal to the cordless facsimile 23 to decouple the cordless facsimile 23 and then, controls the wireless communication portion 17 to finish the coupling to the cordless facsimile in step 50. In the following step 51, the control portion 51 controls the network control portion 12 to disconnect the telephone line in step 51 and ends this processing.

In step 44, there is no CNG signal and a predetermined interval has passed with reference to the timer in step 52, the control portion 13 judges that this call is of a sound communication and calls the cordless phone 18 in step 53. If the cordless phone 18 responds to this in step 54, the control portion 13 couples the cordless phone 18 to the base station unit 11 to link the telephone line with the cordless phone 18 in step 55 to provide a communication in step 56. In the following step 57, if the communication has been terminated, the control portion 13 decouples the cordless phone 18 by transmitting the cordless unit control signal indicative of decoupling in step 58. Then, the control unit 13 operates the network control portion 12 to disconnect the telephone line in step 59 and then, processing ends.

As mentioned above, according to the first embodiment, the base station unit 11 has only the modem 14 and the facsimile signal control portion 15 as facsimile elements except the recording/reading portion 26 in addition to the combination of the base station unit 11 and the cordless phone 18. On the other hand, the cordless facsimile has only the recording/reading portion 34 (has no modem), so that the operator can transmit and receive a copy by the near cordless facsimile 23. Therefore, the facsimile operation is made efficiently.

Moreover, the mode of the base station unit 11 is changed by the cordless unit control signal from the cordless phone 18 or the cordless facsimile 23a.

Figure 3:
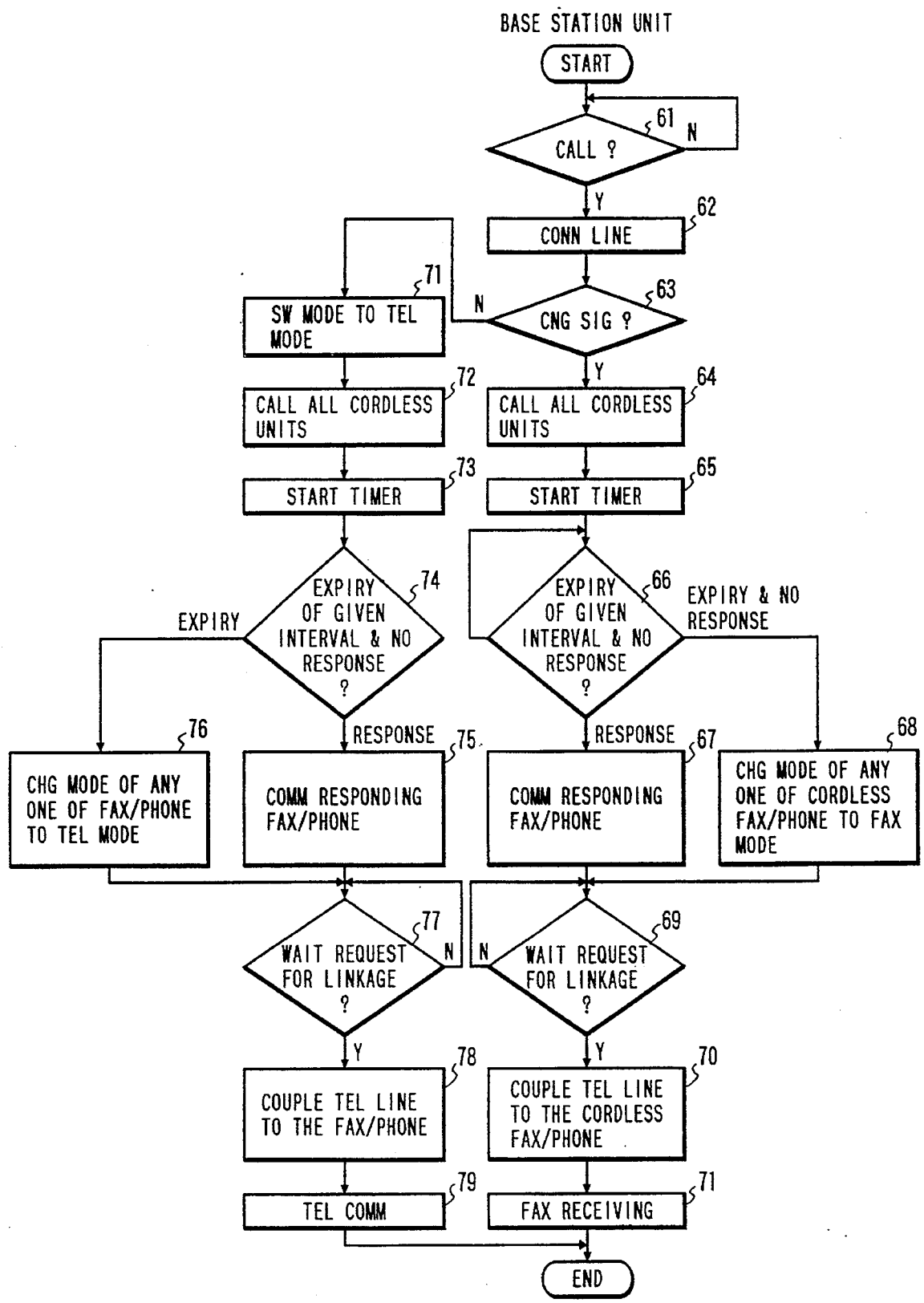
FIG. 3 shows a flow chart of the second embodiment representing an operation of the cordless facsimile/phone.

A second embodiment will be described with reference to FIGS. 1 and 3. FIG. 3 shows a flow chart of the second embodiment representing an operation of the cordless facsimile/phone 28. The cordless facsimile/phone 28a has the switch circuit 30. The switch circuit 30 couples the wireless communication portion 29 to the telephone portion 31 or the facsimile potion 33 in response to the command signal from the operation portion 107 and the cordless unit control signal from the control portion 13 of the base station unit 11. When there is a telephone call from the telephone line, the base station unit 11 operates either of the cordless phone 18 or the cordless facsimile/phones 28a and 28b to respond to the telephone call. When there is a facsimile call from the telephone line, the base station unit 11 operates either of the cordless facsimile 23a to 23c or the cordless facsimile/phone 28a or 28b to respond to the facsimile call.

Then, an operation in the case that all cordless units coupled to the base station unit 11 are the cordless facsimile/phones 28a and 28b will be described with reference to FIG. 3. Here, it is assumed that the switch circuit 16 of the base station unit 11 is initially set to the facsimile communication mode.

When there is a call at the base station unit 11 in step 61, the line is connected by the network connection portion 12 in step 62. In the following step 63, the control portion 13 makes a decision as to whether or not there is the CNG signal in the input signal. If there is the CNG signal, the control portion 13 calls all cordless facsimile/phones 28a and 28b by transmitting the cordless unit control signal through the wireless communication portion 17 in step 64. Then, the control portion 13 starts the timer in step 65. In the following step 66, the control portion 13 waits a response from one of cordless units for a predetermined interval. If one cordless facsimile/phone 28a responds to this, the control portion 13 communicates with the responding cordless facsimile/phone 28a in step 67 and then, waits a request of linkage from the responding facsimile/phone 28a in step 69.

If there is no response from cordless units, the control portion 13 transmits a cordless unit control signal indicative of switching the mode to the facsimile communication mode to any one of the cordless facsimile/phones 28a and 28b through the wireless communication portion 17 in step 68. The control portion 13 waits a request of linkage from the responding facsimile/phone 28b in step 69. If there is a request for the linkage, the control portion 13 couples the telephone line to the responding cordless facsimile/phone 28a or 28b in step 70. Then, in the following step 71, the facsimile receiving operation is carried out and processing ends.

In step 63, if there is no CNG signal, the control portion 13 switches its mode to the telephone communication mode in step 71 and calls all cordless facsimile/phones 28a or 28b by transmitting the cordless unit control signal through the wireless communication portion 17 in step 72. Then, the control portion 13 starts the timer in step 73. In the following step 74, the control portion 13 waits a response from any one of cordless units for a predetermined interval. IF one cordless facsimile/phone 28a or 28b responds to this, the control portion 13 communicates with the responding cordless facsimile/phone 28a or 28b in step 75 and then, waits a request of linkage from the responding facsimile/phone 28 in step 77.

If there is no response from any one of cordless units, the control portion 13 transmits a cordless unit control signal indicative of switching the mode to the telephone communication mode to any one of the cordless facsimile/phones 28a and 28b through the wireless communication portion 17 in step 76. The control portion 13 waits a request of linkage from the responding facsimile/phone 28a or 28b in step 77. If there is a request for the linkage, the control portion 13 couples the telephone line to the responding cordless facsimile/phone 28a or 28b in step 78. Then, in the following step 79, the telephone communication is carried out and processing ends. In the cordless facsimile/phone 28a or 28b, if there is no off-hock and an automatic answering mode is set, the control portion 35 operates the automatic answering portion 108 to respond the call and if there is off-hock, the calling party can communicate with the called party.

As mentioned, there is a possibility that all cordless facsimile/phones 28a and 28b are in the facsimile communication mode or in the telephone communication mode. Therefore, in that case, the base station unit 11 can change the mode of one of the cordless facsimile/phones 28a and 28b to the necessary mode to prevent that the call is neglected.

Figure 4:
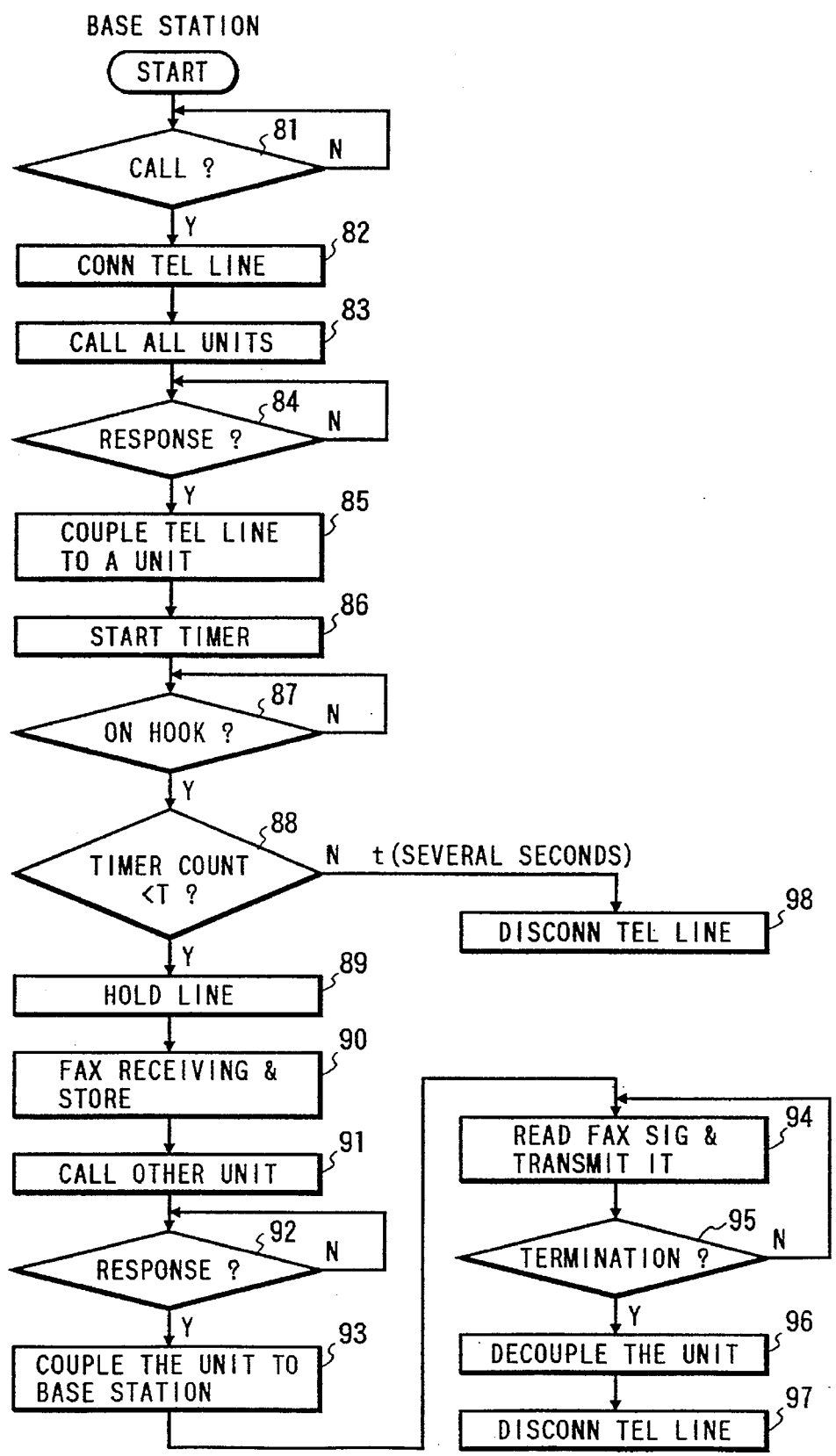
FIG. 4 shows a flow chart representing an operation of a third embodiment.

A third embodiment will be described with reference to FIGS. 1 and 4. FIG. 4 shows a flow chart representing an operation of the third embodiment. The operation of this embodiment will described in the case that all cordless units coupled to the base station unit 11 are the cordless facsimile/phones 28a and 28b and the base station unit 11 calls all cordless facsimile/phones 28a and 28b for facsimile communication and during the facsimile communication, one cordless facsimile/phone 28a in the telephone communication mode off-hooks and then, the operator on-hooks because the operator considers that the facsimile communication does not concern him.

In that case, conventionally, the telephone line was disconnected immediately. However, in this embodiment, the operation is carried out to prevent to neglect the call.

If there is a facsimile call in step 81, the control portion operates th network control portion 12 to connect the telephone line in step 82. In the following step, the control portion 11 calls all cordless facsimile/phones 28a and 28b in step 83. If there is a response from one of the cordless facsimile/phones 28a in step 84, the control portion 11 couples the responding cordless facsimile/phone 28a to the base station 11 to form a linkage in step 85 and starts the timer and receive and stores the facsimile signal in the memory in the facsimile signal control portion in step 86. In the following step 87, the control portion detects whether or not there is on-hook and breakage of the linkage. If there is on-hook in step 87, the control portion 11 checks whether or not the timer count is less than a predetermined value t. If the timer count is less than the predetermined value t, the control portion judges that the operator effects the off-hooking in error or intentionally, so that the control portion 11 holds the line in step 89 and receives the facsimile signal and stores it in the memory in the facsimile signal control portion 15 in step 90. Then, the control portion 11 calls other cordless facsimile/phone 28b in step 91. If the called cordless facsimile/phone 28b responds in step 92, the control portion 11 couples the cordless facsimile/phone 28b to form a linkage in step 93. Then, the control portion operates the facsimile signal control portion 15 to read out the facsimile signal from the memory to transmit it to the responding cordless facsimile/phone 28b in step 94. If the transmitting of the facsimile signal has terminated in step 95, the control portion 11 operates the network control portion 12 to disconnect the line in step 97. In step 98, if the timer count is not less than the value t, the control portion 11 disconnects the line in step 98 because if the timer count exceeds the predetermined value t, the facsimile receiving is considered to be done normally.

As mentioned above, according to this embodiment, after off-hook, it is possible to receive the facsimile signal though an erroneous on-hook is made, so that this prevents to neglect the call.

Figure 5:
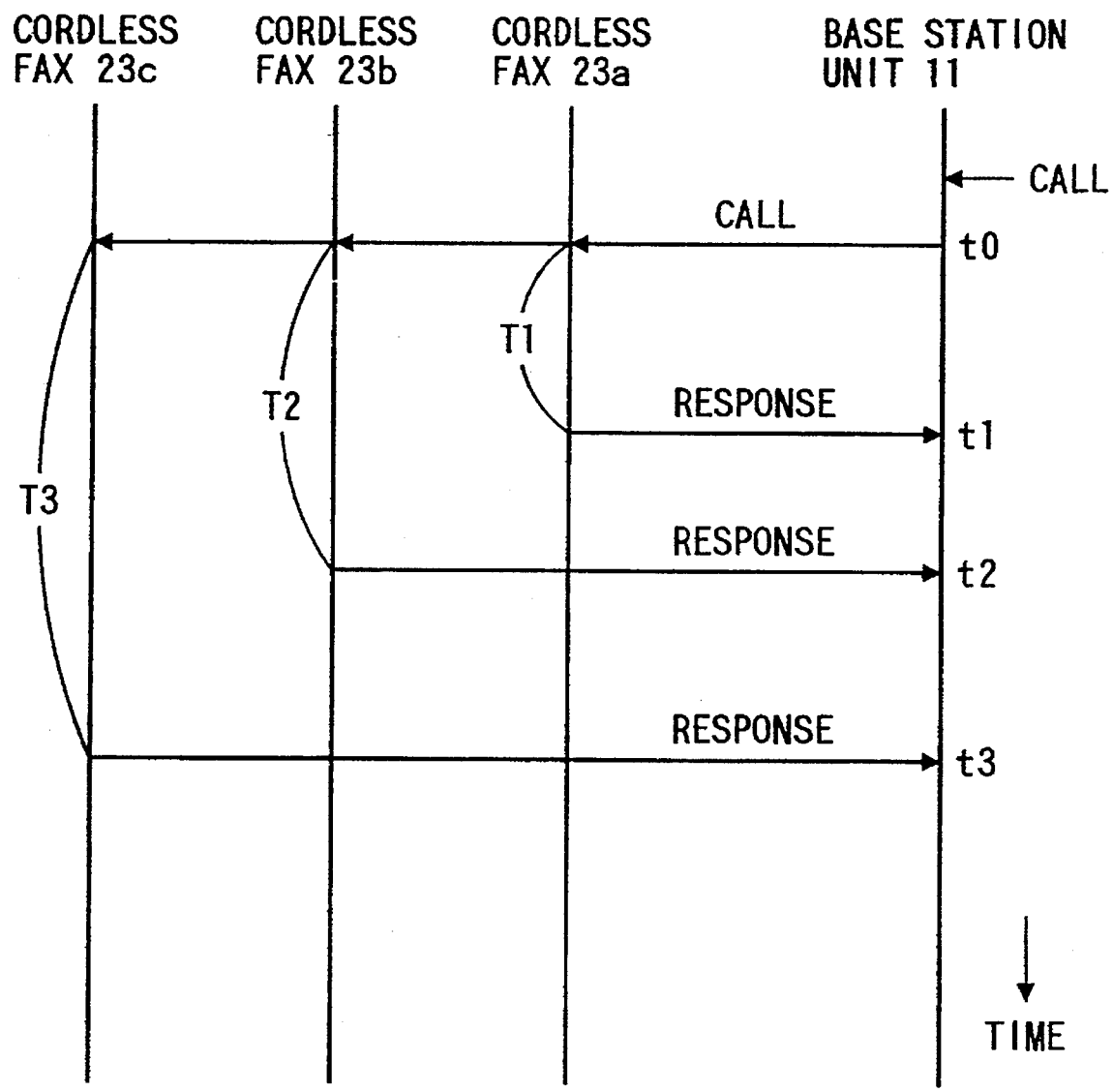
FIG. 5 is a time chart of a fourth embodiment showing a response operation of cordless units.

A fourth embodiment will be described with reference to FIG. 1 and FIG. 5. FIG. 5 is a time chart of the fourth embodiment showing a response operation of cordless units. In this embodiment, the response operation will be described in the case that there are plurality of the cordless facsimiles 23a to 23c and/or the cordless facsimile/phones 28a and 28b.

Respective cordless units, namely, the cordless facsimiles 23a to 23c and the cordless facsimile/phones 28a and 28b have timers in their control portions. The timers in the respective cordless units are set to different target values. This is set by respective operation portions 105 and 107 by an operator or may be set before the shipment of this communication apparatus.

When there is a call from the telephone line, the control portion 11 calls all cordless facsimiles 23a to 23c at t0. Then, after interval T1, the cordless facsimile 23 responds to this call. Then, after interval T2 from the call by the base unit 11, the cordless facsimile 23b responds to the call from the base unit 11. Then, after interval T3 from the call by the base unit 11, the cordless facsimile 23c responds to the call from the base unit 11 as shown in FIG. 5 wherein T1<T2<T3. When one of the cordless facsimiles 23a to 23c responds, other cordless facsimiles stop the responding. Therefore, if the base station unit 11 calls all cordless facsimile 23a to 23c, the cordless facsimiles 23a to 23c respond to this call in the predetermined order. That is, the cordless facsimile 23a can receive the facsimile call with a priority, so that the facsimile receiving is carried out efficiently.

Figure 6:
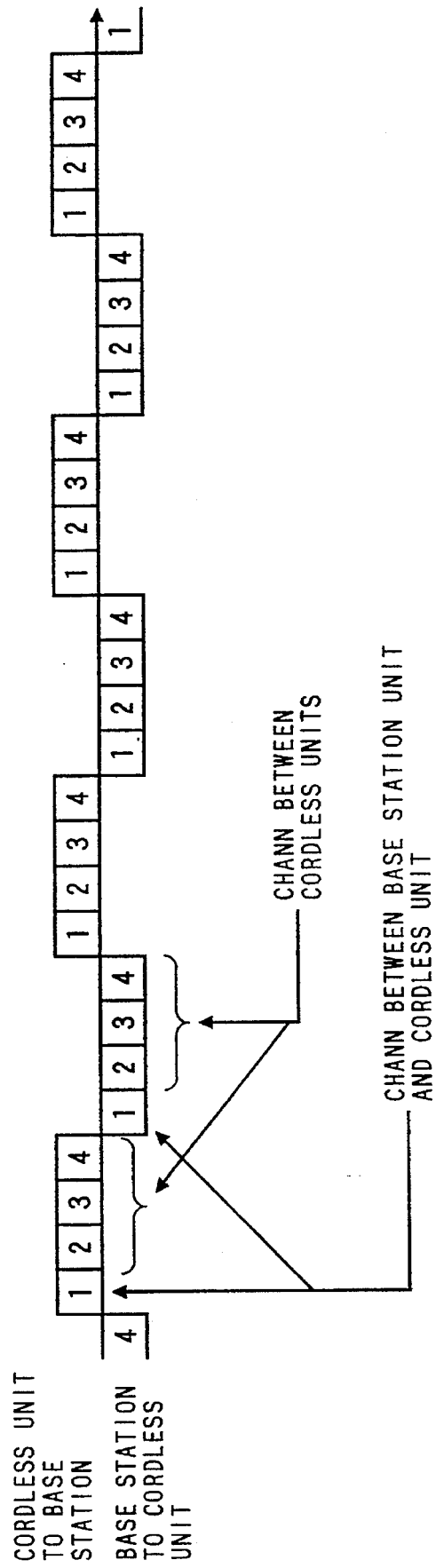
FIG. 6 is an illustration of a fifth embodiment showing a multi-channel communication operation.
Figure 7:
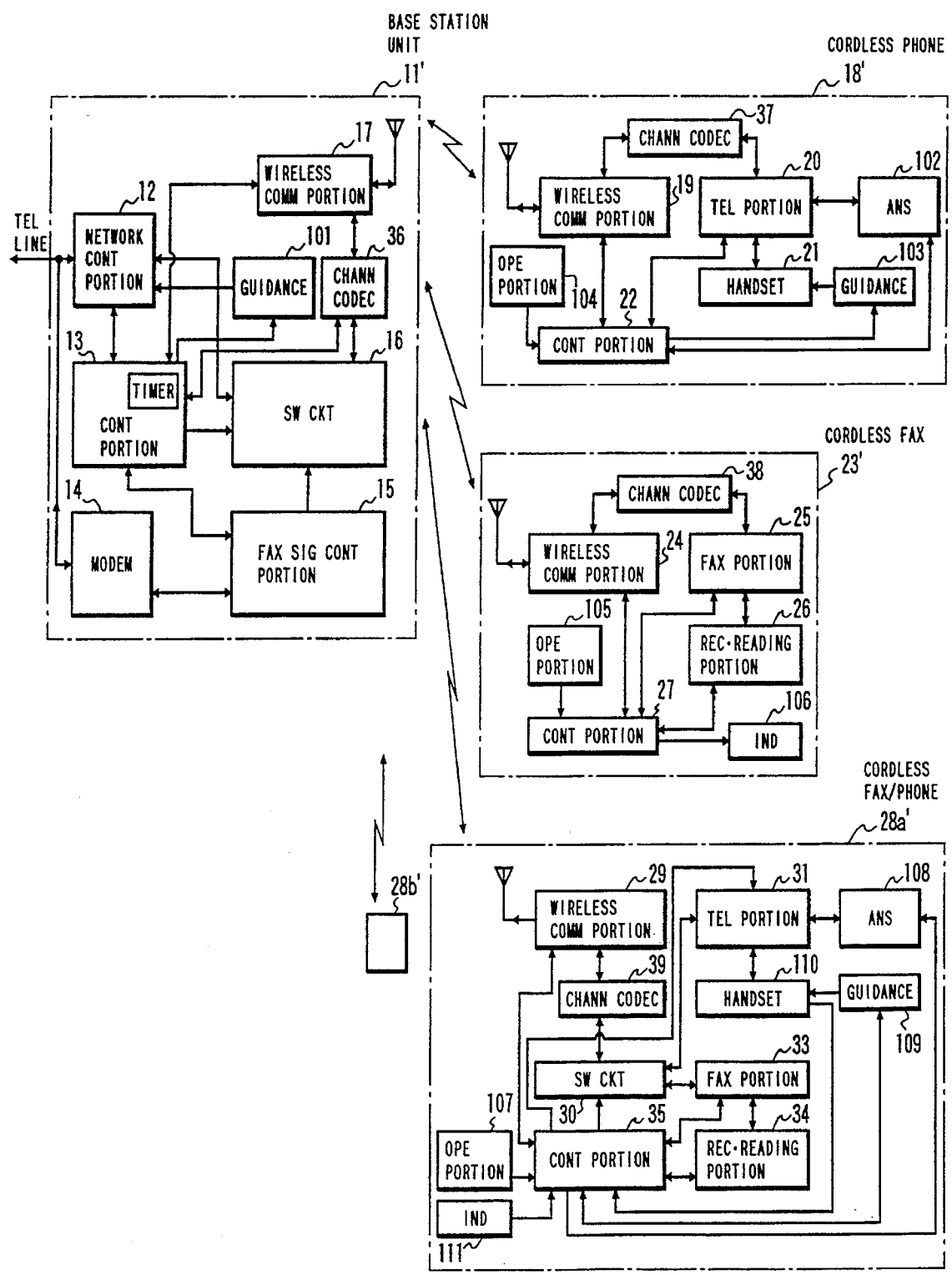
FIG. 7 is a block diagram of the fifth embodiment of the communication apparatus with wireless intercommunication.

A fifth embodiment will be described with reference to FIGS. 6, 7, and 8. FIG. 6 is an illustration of the fifth embodiment showing a multi-channel communication operation. FIG. 7 is a block diagram of the fifth embodiment of the communication apparatus with wireless intercommunication. FIG. 8 is a time chart of the fifth embodiment showing the multi-channel communication operation.

In this embodiment, the base station unit 11' and the cordless units communicates by the time division multiple access and the time division bi-directional (TDMA/TDD) transmission method. The TDMA/TDD method is as follows:

The carrier is time-divided to provide a plurality off channels where a bi-directional communication, namely, the first direction (from the cordless units to the base station unit 11') and the second direction (from the base station unit 11' to the cordless units) communication, is provided. Each of the first and second direction communication is divided into four units, namely, four time slots as shown in FIG. 6. Each communication channel is assigned to the first and second direction communication. Therefore, for example, the first communication channel is assigned to the communication between the base station unit 11' and one cordless unit and the remaining three communication channels are assigned to communication between cordless units each other. Therefore, a facsimile communication and a telephone communication between the extensions, namely, the cordless units are possible in this communication apparatus while one cordless unit communicates with the base station unit 11' to transmit or receive a facsimile signal or a telephone signal.

In FIG. 7, the basic structures of the base station unit 11', the cordless phone 18', the cordless facsimile 23', and cordless facsimile/phone 28'a or 28'b are the same as the first embodiment. The difference is in that channel codec portions 36, 37, and 39 are added respectively. The channel codec portion 36 is provided between the wireless communication portion 17 and the switch circuit 16 for effecting the multi-channel communication operation, that is, a signal transmitted by the wireless communication portion 17 is time-divided and a signal received by the wireless communication portion 17 is connected to reproduce the received signal. Similarly, the channel codec portion 37 is provided in the cordless phone 18' between the wireless communication portion 19 and the telephone portion 20. The channel codec portion 38 is provided in the cordless facsimile 23' between the wireless communication portion 24 and the facsimile portion 25. Each of channel codec portions 36, 37, and 39 has a memory for timing adjustment.

An operation will be described with reference to FIG. 8. Here, it is assumed that the cordless facsimile/phone 28'a and 28'b are used. If there is a facsimile call from a calling facsimile through the telephone line, the base station unit 11' informs the cordless facsimile/phone 28'a of the reception of the call. In response to the cordless facsimile/phone 28'a requests the formation of linkage to the base station unit 11'. Then, the base station unit 11' forms the linkage to the cordless facsimile/phone 28'a. Then, a condition of the signal passage is confirmed and other necessary actions by exchange signals between the calling facsimile and the cordless facsimile/phone 28'a through the base station unit 11'. Then, the base station unit 11' receives a facsimile signal from the calling facsimile and transmits the received facsimile signal through the radio wave signal to the cordless facsimile/phone 28'a. The cordless facsimile/phone 28'a records an image from the received facsimile signal by the recording/reading portion 34.

During this operation, if an operator desires to communicate from the cordless facsimile/phone 28'a to the cordless facsimile/phone 28'b, the operator can communicate with a called operator of the cordless facsimile/phone 28'b. That is, the calling operator off-hooks the cordless facsimile/phone 28'a and depress an extension call key (not shown) provided to the operation portion 107 and then, depresses a number key also provided to the operation portion 107 corresponding to the identifying number of the extension of the cordless facsimile/phone 28'b. Then, the control portion 35 transmits this operation command through the wireless communication portions 29 and 17 to the control portion 13 of the base station unit 11'. The control portion 13 of the base station unit 11' searches a free communication channel using the wireless communication portion 17 and transmits data of the free channel to the cordless facsimile/phones 28'a and 28'b. The cordless facsimile/phones 28'a and 28'b can communicate with each other through the searched free channel. As the result of the communication, the operator of the cordless facsimile/phone 28'a should transmit the copy. The cordless facsimile/phone 28'a can transmit the received copy to the cordless facsimile/phone 28'b after the transmitted copy from the calling outside facsimile has been received.

That is, the facsimile/phone 28'b waits a facsimile call from the facsimile/phone 28'a in a facsimile communication mode. In this condition, if the operator of the facsimile/phone 28'a desires to communicate with the operator of the facsimile/phone 28'b again, the operator off-hooks and depresses the extension call key and the number key corresponding to the identifying number of the extension of the cordless facsimile/phone 28'b, so that the cordless facsimile/phone 28'b receives this request through the free channel searched by the control portion 13. In response to this, the control portion 35 of the cordless facsimile/phone 28'b transmits a cordless unit control signal indicating that this cordless facsimile/phone 28'b is in the facsimile mode to the cordless facsimile/phone 28'a. The control portion 35 of the cordless facsimile/phone 28'a informs that the called unit is in the facsimile mode using the guidance portion 109, having a voice synthesizer and a memory, and the handset 110 or using the indicator 111. Therefore, the communication channel is released rapidly, so that the communication apparatus is operated more efficiently.

As mentioned above, according to this embodiment, the radio transmission between the base station 11' and the cordless units is carried out by the TDMA/TDD method, so that the cordless units can communicates each other and during one cordless facsimile/phone communicates with outside facsimile through the base station 11', it is possible that cordless units can effect the extension communication each other. This is because the modem is not provided in the cordless units and the cordless units can effect digital communication directly. In this embodiment, other controlling mentioned in the earlier embodiments can be applied. In this embodiment, the multi-channel is provided by the TDMA/TDD method. However, the multi-channel may be provided by a plurality of carrier signals having different frequencies.

As mentioned above, the base station unit 11 includes only the modem 14 for effecting the facsimile operation and other recording/reading portion 26, and 34 for effecting the facsimile operation are provided to the cordless facsimile 23a and cordless facsimile/phone 28a or 28b, so that the facsimile receiving and transmission can be carried out by the near cordless facsimile.

Moreover, if the cordless unit has both facsimile and telephone functions, the mode can be changed in accordance with the operation by the operation portion thereof and in addition, the base station unit 11 can change the mode of the cordless unit to the other mode, so that though there is a call and no cordless unit is in the corresponding mode, this communication apparatus can response this call because the base station 11 can change the mode of any one of the cordless units.

Moreover, the intercommunication between the base station and the cordless units or between the cordless units are carried out by the time division multiple access and the time division bi-directional transmission method, so that cordless units communicate each other through the control of the base station unit 11. Further, the cordless units can communicate each other during one cordless facsimile/phone communicates with outside facsimile through the base station.

What is claimed is:

1. A communication apparatus comprises:
    a base station coupled to a communication line having:
        a network control portion for controlling a communication with said communication line and receiving a first sound signal from said communication line and transmitting a second sound signal to said communication line:
        a first control portion for detecting a telephone call and a facsimile call from said communication line, generating a first cordless control signal and a switch control signal, and receiving a second cordless control signal;
        a modem for demodulating a first facsimile signal from said communication line and modulating and transmitting a second facsimile signal to said communication line:
        a first wireless communication portion for transmitting said first sound signal from said network control portion, said first facsimile signal from said modem, and said first cordless unit control signal from said control portion, and receiving and supplying said second sound signal to said network control portion, said second facsimile signal to said modem, and a second control signal to said control portion; and
        a switch circuit responsive to said switch control signal for providing a first signal passage for said first and second sound signals between said network control portion and said wireless communication portion in a telephone mode and providing a second signal passage for said first and second facsimile signal between said wireless communication portion and said modem in a facsimile mode; and
    at least a cordless unit having:
        a second wireless communication portion for receiving said first sound signal, first facsimile signal, and said first cordless unit control signal from said wireless communication portion and transmitting said second sound signal signal, said second facsimile signal, and said second cordless unit control signal toward said first wireless communication;

a facsimile recording and reading portion for recording said first facsimile signal from said second wireless communication portion and reading a copy and supplying said second facsimile signal to said base station through said first and second wireless communication portions; and a second control portion for receiving said first cordless unit control signal from said second wireless communication portion and generating said second cordless unit control signal, said first and second control portion effecting a controlling through said first and second cordless unit control signals such that in response to said detected call, wherein said first control portion communicates with said second control portion to receive said first facsimile signal through said first and second wireless communication portions and in response to a command, and said second control portion communicates with said first control portion to transmit said second facsimile signal to said communication line through said first and second wireless communication portions.

2. A communication apparatus as claimed in claim 1, wherein said cordless unit further comprises:

a telephone portion, having a handset, for receiving and reproducing said first sound signal from said second wireless communication portion and supplying said second sound signal to said second wireless communication portion; and a second switch circuit for providing a third signal passage for said sound signal between said second wireless communication portion and said telephone portion in a telephone mode and providing a fourth signal passage for said facsimile signal between said second wireless communication portion and said recording and reading portion in said facsimile mode.

3. A communication apparatus as claimed in claim 1, further comprising:

a cordless phone having:

a third wireless communication portion for receiving said first sound signal from said first wireless communication portion and transmitting said second sound signal to said first wireless communication portion; and a telephone portion, having a handset, for receiving and reproducing said first sound signal from said third wireless communication portion and supplying said second sound signal to said third wireless communication portion;

a third control portion, said first and third control portion effecting controlling such that in response to said detected telephone call, wherein said first control portion communicates with said third control portion through said first and second cordless unit control signals to receive said first facsimile signal through said first and third wireless communication portions and in response to a command, and said third control communicates with said first control portion to transmit said second facsimile signal to said communication line through said first and third wireless communication portions through said first and second cordless unit.

4. A communication apparatus as claimed in claim 1, wherein said network control portion holds the communication line when said first control portion detects said facsimile call and said first control portion calls said cordless unit using said First cordless unit control signal to cause said second control portion to communicate with a calling facsimile sending said facsimile call through said first and second wireless communication portions.

5. A communication apparatus as claimed in claim 1, wherein said base station further comprises a timer for measuring a predetermined interval, said network control portion holds the communication line when said first control portion detects said facsimile call, said first control portion calls said cordless unit using said first cordless unit control signal in response to said detected facsimile call, starts said timer and waits a response from said cordless unit, said second control portion returns a response using said second cordless unit control signal to said first control portion if said cordless unit is in a ready state, and in response to said response, said first control portion causes said second control portion to communicate with a calling facsimile through said first and second wireless communication portions if said response reaches the first control portion within said predetermined interval.

6. A communication apparatus as claimed in claim 2, wherein said base station further comprises a timer for measuring a predetermined interval, said network control portion holds the communication line when said first control portion detects said facsimile call, said first control portion calls said cordless unit using said first cordless unit control signal, stares said timer, and waits a response from said cordless unit, said second control portion returns said response using said second cordless unit control signal to said first control portion in said facsimile mode, and in response to said response, said first control portion causes said second control portion to control said second switch circuit to said facsimile mode if said response does not reach the first control portion within said predetermined interval.

7. A communication apparatus as claimed in claim 2, wherein said base station further comprises a timer for measuring a predetermined interval, said network control portion holds the communication line when said first control portion detects said telephone call, said first control portion calls said cordless unit using said first cordless unit control signal, starts said timer, and waits a response from said cordless unit, said second control portion returns said response to said first control portion in said telephone mode, and in response to said response, said first control portion causes said second control portion to control said second switch circuit to said telephone mode if said response does not reach the first control portion within said predetermined interval.

8. A communication apparatus as claimed in claim 2, wherein said communication apparatus comprises first and second of said cordless units, said base station further comprises a timer for measuring a predetermined interval and a memory for storing said first facsimile signal from said modem, said network control portion holds the communication line when said first control portion detects said facsimile call, said first control portion calls said first and second cordless units using said cordless unit control signal, said second control portion returns a response to said first control portion in said facsimile mode, in response to said response, said first control portion causes said second control portion of said first cordless unit to receive said first facsimile signal, starts said timer and stores said first facsimile signal in said memory, said handset generates an on-hook signal in response to a command, and said first control portion reads said first facsimile signal from said memory and transmits it to said second cordless unit.

9. A communication apparatus as claimed in claim 1, wherein said communication apparatus comprises a plurality of said cordless units having timers having different intervals respectively, said network control portion holds the communication line when said first control portion detects said facsimile call and said first control portion calls said cordless units using said first cordless unit control signal, each off said second control portion returns a response to said first control portion in response to said facsimile call with said different interval delay if said cordless unit is in a ready state.

10. A communication apparatus as claimed in claim 2, wherein said communication apparatus comprises first and second units of said cordless units, said second control portion off said first unit further detects a request of an extension communication to said first unit from said second unit, said second unit further comprises a guidance portion for outputting said predetermined message in response to a cordless unit control signal, and said second control portion of said first unit generates and transmits said cordless unit control signal via said second wireless communication portion thereof to said second unit when said second switch circuit of said first unit is in said facsimile mode and said second control portion of said first unit detects said request from said second unit.

11. A communication apparatus as claimed in claim 2, further comprising:

a cordless phone having:

a third wireless communication portion for receiving said first sound signal from said first wireless communication portion and transmitting said second sound signal to said first wireless communication portion;

a telephone portion, having a handset, for receiving and reproducing said first sound signal from said third wireless communication portion and supplying said second sound signal to said third wireless communication portion and generating a request of an extension communication in response to a command; and a guidance portion for outputting a predetermined message in response to a cordless unit control signal, wherein said second control portion further detects said request to said cordless unit from said cordless phone, and said second control portion generates and transmits said cordless unit control signal via said second wireless communication portion thereof to said cordless phone when said second switch circuit off said cordless unit is in said facsimile mode and said second control portion detects said request from said cordless phone.

12. A communication apparatus as claimed in claim 1, wherein said communication apparatus comprises first and second of said cordless units, said second control portion of said first of said cordless units generates a facsimile extension communication request signal to said second of said cordless unit, said first wireless communication portion receives a second facsimile signal from said first of said cordless units and transmitting said second facsimile signal to said second of said cordless unit in response to said facsimile extension communication request signal, and said base station receives said first facsimile signal from said communication line and transmits the received first facsimile signal to either of first and second of said cordless units using said first wireless communication portion through said modem in response to a detected facsimile call.

13. A communication apparatus as claimed in claim 1, wherein said communication apparatus comprises first and second of said cordless units, said second control portion of said first of said cordless units generates a facsimile extension communication request signal to said second of said cordless unit, said first wireless communication portion has:

multi-channel portion for transmitting and receiving said sound and facsimile signals and a second facsimile signal from said first of said cordless units through a first channel of a plurality of channels for transmitting said second facsimile signal to said second of said cordless units in response to said facsimile extension communication signal, and said base station transmits said first facsimile signal to and receives said second facsimile signal from either of first and second of said cordless units using said first wireless communication portion through said modem in response to said detected facsimile call through a second channel of said plurality of channels.

* * * * *